Sept. 7, 1948.
C. A. DE GIERS ET AL
ELECTRICAL VERNIER TYPE TELEMETRIC
INDICATING SYSTEM
2,448,783
Filed Sept. 29, 1944
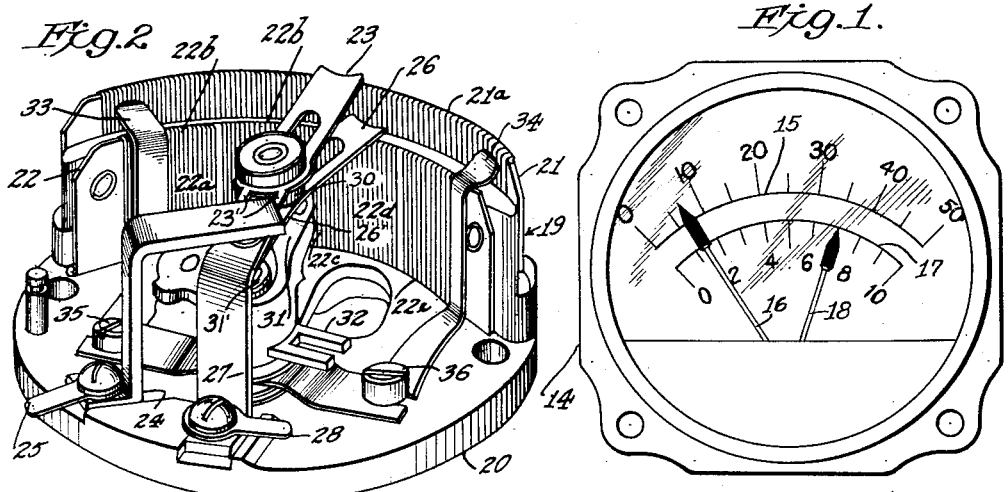
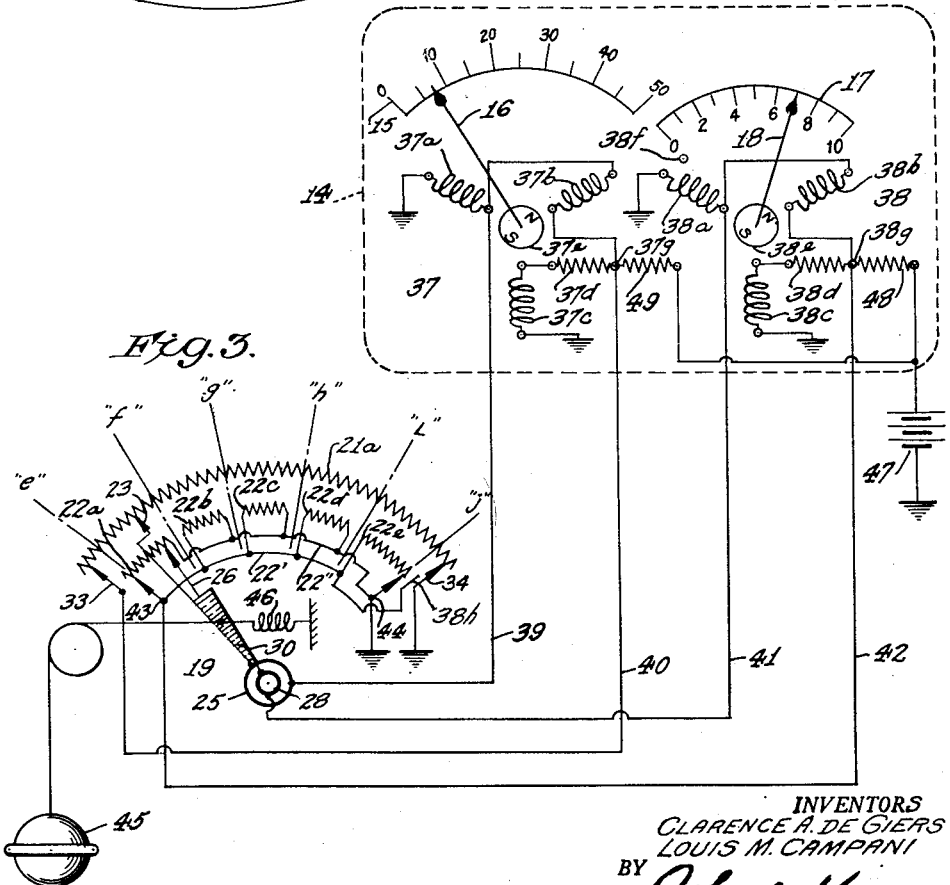
INVENTORS
CLARENCE A. DE GIERS
LOUIS M. CAMPANI
BY
John C. Kerr
ATTORNEY INVENTORS
CLARENCE A. DE GIERS
LOUIS M. CAMPANI
BY John C. Kerr
ATTORNEY Sept. 7, 1948.  C. A. DE GIERS ET AL  2,448,783
ELECTRICAL VERMIER TYPE TELEMETRIC
INDICATING SYSTEM
Filed Sept. 29, 1944  3 Sheets-Sheet 3
Fig. 6.
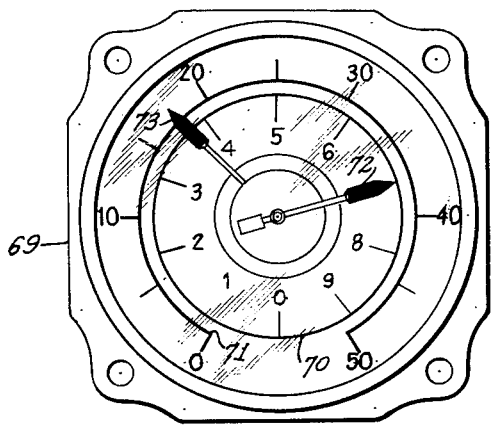
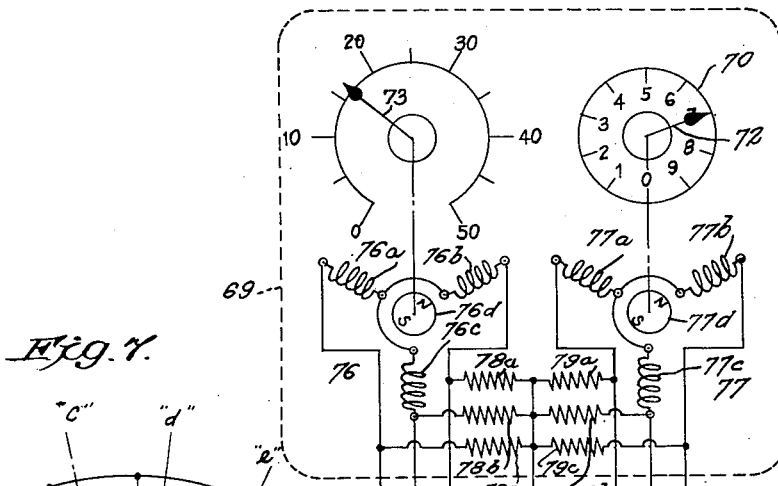
Fig. 7.
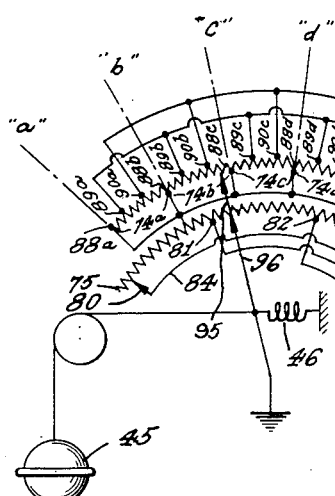
INVENTORS
CLARENCE A. DE GIERS
LOUIS M. CAMPANI
BY
John C. Kerr
ATTORNEY Patented Sept. 7, 1948

2,448,783

UNITED STATES PATENT OFFICE 2,448,783

ELECTRICAL VERNIER TYPE TELEMETRIC INDICATING SYSTEM

Clarence A. de Giers, Forest Hills, and Louis M. Campani, Freeport, N. Y., assignors to The Liquidometer Corporation, Long Island City, N. Y., a corporation of Delaware Application September 29, 1944, Serial No. 556,330

3 Claims. (Cl. 177—351)

This invention relates generally to improvements in indicating devices and has particular reference to improvements in electrically controlled indicating devices.

One object of the invention is to provide means to increase the accuracy of the indications of the device.

Another object is to provide means for amplifying or enlarging the scale of the device on which the indications appear.

Another object of the invention is to provide a scale for coarse indications and a second scale for fine indications, the entire range of the fine scale being arranged to correspond to a fraction of the range of the coarse scale.

Still another object of the invention is to provide means by which the amplification and enlargement of the indications are obtained without any, or at least without any substantial, increase of the size of the indicating device.

Indicating devices according to the invention can be advantageously used for the measurement of liquid levels, pressures, temperatures, etc. They can be employed in many fields of application. However, it should be noted that they are particularly useful where the available space is limited. For example the panel space in present aircraft is very limited due to the multiplicity of instruments required for the operation of such aircraft. Hence, size and scale length of each indicator are necessarily limited thus reducing the readability and accuracy of the system. The above enumerated features of the invention eliminate these difficulties by providing the equivalent of a long indicator scale without increasing the size of the indicator, particularly of its dial.

Other and further features and advantages of the invention will appear hereinafter and in the appended claims forming part of the specification.

In the accompanying drawings several embodiments of the invention are shown by way of illustration and not by way of limitation.

Figure 4:
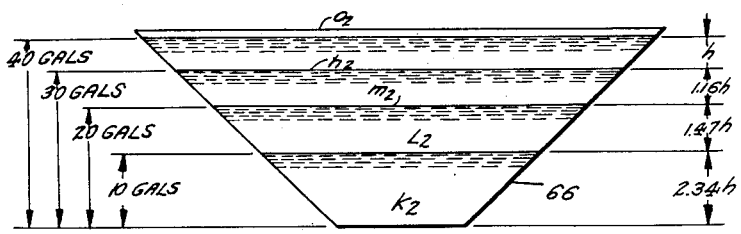
Figure 5:
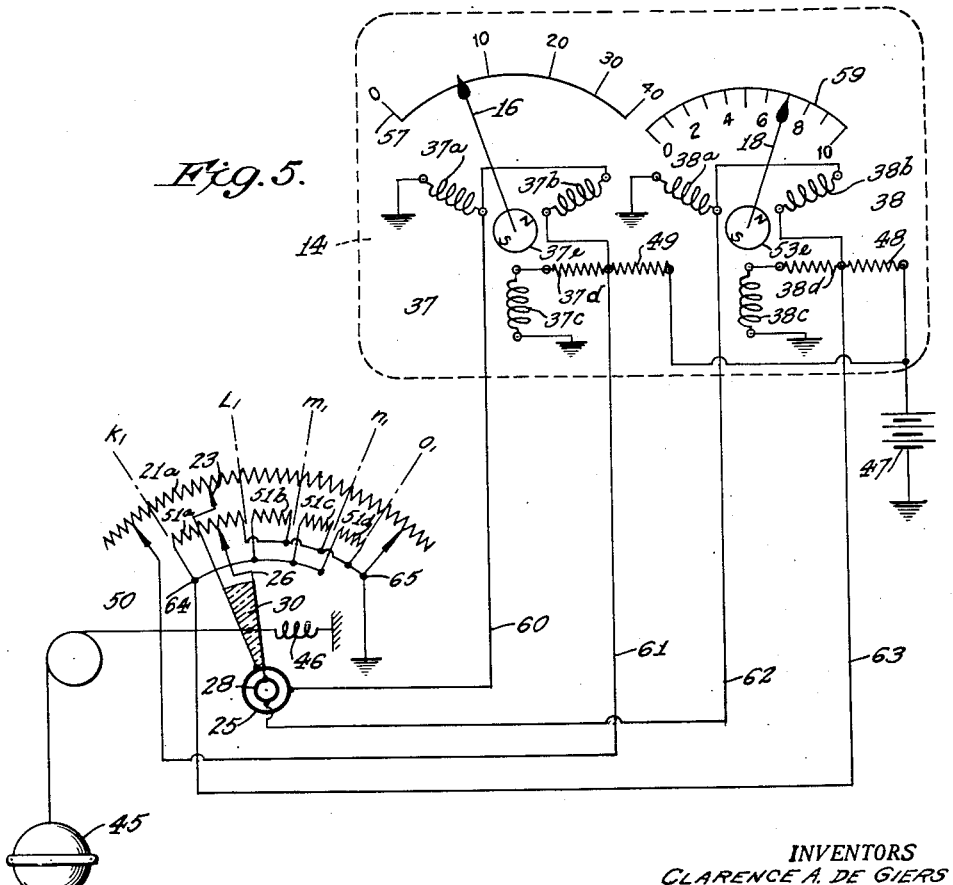

Figure 1 is a plan view of an indicator according to the invention,

Figure 2 is a fractional perspective view of a transmitter suitable for the operation of the indicator shown in Figure 1, Figure 3 is an electric circuit diagram schematically illustrating one embodiment of the invention, Figure 4 is a schematic view of a tank having a non-uniform cross section, Figure 5 is a schematic circuit diagram of a modified form of a transmitter which may be used in conjunction with the tank of non-uniform cross section shown in Figure 4, Figure 6 is a plan view of an indicator suitable for use with the present invention and having a 360° scale, and Figure 7 is a schematic circuit diagram of another modification of the invention, suitable for operation with a 360° indicator as shown in Figure 6.

The circuit diagram shown in Figure 3 comprises an indicator 14 also shown in Figure 1 which includes ratiometers 37 and 38. The ratiometer 37 comprises deflecting coils 37a and 37b. One end of coil 37a is grounded, the other end is connected to one end of coil 37b. The coils control the position of a magnetized rotor 37e which carries a pointer 16 playing over a scale 15. This scale is calibrated in units to be measured, for example, in gallons when gasoline in a tank is to be indicated. The illustrated scale 15 has a range of 50 gallons subdivided into units of 10 gallons. The ratiometer 37 further comprises a scale control coil 37c which is grounded at one end and connected at the other end to one end of a resistor 37d. Coil 37c determines the total length of the scale 15 depending on the current allowed through it by resistor 37d. This resistor and one end of ratiometer coil 37b are connected through a series resistor 49 to one terminal of a source of current 47, the other end of which is grounded. A conventional zero return magnet (not shown) may be provided to bring pointer 16 below "0" to indicate when the ratiometer is not in use. The second ratiometer 38 is similar to ratiometer 37. It comprises deflecting coils 38a, 38b, a magnetized rotor 38e, supporting a pointer 18 playing over a scale 17, a scale control coil 38c, a resistor 38d and a series resistor 48. Means are preferably provided to prevent pointer 18 to drop below "0" on scale 17. These means may consist of a proper adjustment of a conventional zero return magnet or a pointer stop 38f. Scale 17 is subdivided into 10 units. The entire range of scale 17 is arranged to correspond to a movement of pointer 16 from "0" to "10" or "10" to "20" and so on. It is of course also possible to calibrate scale 17 for any other fraction of the range of scale 15.

Ratiometers of the type previously described are fully disclosed and illustrated in U. S. Patent 2,339,021 granted January 11, 1944, to Frederick J. Lingel. However, it should be noted that other suitable types of ratiometer may likewise be used. Furthermore milliammeter types of indicators may also be employed if suitable provisions can be made for a constant supply of current.

The ratiometers are controlled by a transmitter 19 shown in Figures 2 and 3. This transmitter comprises two strips 21 and 22 preferably made of insulating material such as known under the trade name Bakelite and mounted on a suitable base 20. Strip 21 supports a single resistance winding 21a extending substantially throughout the entire length of strip 21. Strip 22 supports a multiplicity of resistance windings such as 22a, 22b, 22c, 22d and 22e all having normally the same resistance. The left hand ends of all windings 22a, 22b, etc., are connected to a common lead 22' connected to a terminal 43 which in turn is connected through lead 42 to a point 38g. The right hand ends of windings 22a, 22b, etc., are connected through a common lead 22" to a terminal 44 which is grounded. Hence all the resistance windings on strip 22 are connected in parallel. The number of windings on strip 22 depends on the individual application. It may vary from two to as many as are possible within practical limits. Cooperating with the resistance winding on strip 21 and resistance windings on strip 22 are wiper arms 23 and 26 respectively. These wiper arms are electrically insulated by any suitable means such as a bushing 30 but rigidly mounted on an insulated support 31 which is pivotal about a shaft 31' thus permitting wipers 23 and 26 to cover simultaneously the full range of their respective windings. Support 31 may be angularly operated by any conventional linkage system applied to a fork 32, for example, the linkage system may support a float floating upon a liquid such as gasoline the level of which then will determine the angular position of fork 32 and hence of wipers 23 and 26. Figure 3 indicates schematically a float 45 which is operatively connected with support 31 and a retraction spring 46 and will consequently determine the angular position of this support. Wiper 23 has an extension 23' engaging a bracket 24 connected to a terminal 25 which in turn is connected to one end of coil 37a through a lead 39. Wiper 26 has an extension 26' engaging a bracket 27 extended to a terminal 28 which is connected to one end of coil 38a through a lead 41. Contact shoes 33 and 34 respectively operated through eccentric adjustment screws 35 and 36 respectively serve to make contact with the ends of winding 21a and also as scale adjustments for scale 15. Adjustment means of this type are fully described in U. S. Patent 2,195,813, patented April 2, 1940, to Clarence A. de Giers and are not part of this invention. Similar adjustment means may be provided if desired for the resistance windings on strip 22. Contact shoe 33 is connected by a lead 40 to a point 37g and contact shoe 34 is grounded. Transmitter winding 21a operates ratiometer 37 of the indicator 14 and transmitter windings 22a, 22b, etc., control ratiometer 38.

A short circuiting contact 38h connected to common lead 22' may be provided to return pointer 18 into the zero position after having covered its entire range on scale 17.

The system illustrated in Figure 3 is a grounded system. However, ungrounded systems may be used also. Then a connection must be provided between one terminal of the source of supply 47 and the transmitter.

The operation of the invention will now be described in detail in connection with the measurement of liquid levels. Assuming that float 45 shown in Fig. 3 is at its bottom position, then wipers 23 and 26 will be on axis e and pointer 16 will indicate "0" on scale 15, while pointer 18 will be on "0" of scale 17. As float 45 begins to rise, due to an increase of the liquid level to be measured, wipers 23 and 26 will move over the respective windings simultaneously toward axis f. The individual windings 22a, 22b, etc., are adjusted so that pointer 18 will cover its entire range when pointer 16 moves from "0" to "10," from "10" to "20," etc. Consequently when axis f is reached, pointer 16 will indicate "10" on scale 15 while pointer 18 will have traveled the full length of scale 17 to calibration mark "10." Thus for this displacement, the distance between "0" and "10" on scale 15, which may normally be 18°, has been amplified to a distance from "0" to "10" on scale 17, or approximately 90°. When the wipers reach axis f, wiper 26 will engage the end of winding 22a and the beginning of winding 22b, or in effect, points 43 and 44. This de-energizes element 38 of indicator 14 causing the pointer 18 to drop back to "0" on scale 17. As soon as wiper 26 loses contact with the end of winding 22a, and is making contact with the beginning of winding 22b, only, element 38 will be at the same electrical potential as when the wiper was at the beginning of winding 22a. The cycle, therefore, will be repeated. When the wipers 23 and 26 travel from axis f to g, pointer 16 will move from "10" to "20" on scale 15, and pointer 18 will again travel the full length of scale 17 from "0" to "10." Upon reaching axis g, wiper 26 will engage the end of winding 22b and the beginning of winding 22c. Points 43 and 44 will again be shorted, and pointer 18 will drop back to "0" ready to start a third cycle. The same action is repeated at axis h; i and j, and at as many other points for which the system is designed. When the wipers reach the end of their stroke, axis j, pointer 16 will have reached "50" on scale 15, and pointer 18 will again be at "10" on scale 17, indicating the full content of the tank. At this point shorting contact 38h will cause pointer 18 again to drop to zero.

It will now be realized that readings taken on indicator 14 will be indicated on the combination of two scales. Thus, for example, scale 15 may indicate "tens" of a unit, while scale 17 indicates single units. The effective length of the scale is thereby increased as many times as there are windings on strip 22 of the transmitter. If, in the example shown, the liquid level was measured with an indicator not provided with the elements of this invention, that is if an indicator such as indicator 14 of Fig. 1, would be equipped only with a scale 15 the readings taken on scale 15 of this indicator by pointer 16 would be limited to 90°. Hence the particular reading illustrated could only be estimated to be approximately "7" or "8." However, with the indicator according to the invention shown on Figs. 1, 2 and 3, the total length of the scale is in effect 5 x 90° or 450°. The reading which was roughly estimated at "7" or "8" on scale 15, can now be more definitely determined to be "7" on the unit scale 17 of indicator 14.

In the above specification, it has been assumed that the changes of the quantity to be measured are uniform. However, in many cases for example in the measurement of fluid levels the indicator is complicated, inasmuch as volume is intended to be measured and the volume due to peculiarities in the shape of the retaining vessel, is often not proportional to the height of the fluid. Fig. 4 illustrates a tank of nonuniform cross section. For the purpose of illustration, the tank has been shown to be of 40 gallons capacity and with sides sloping toward the bottom. It will be apparent from the drawing that the height of the first 10 gallons will be 2.34 times the height $h$ of the last 10 gallons. In order to make the system responsive to volume, transmitter 50 is modified, as shown in Fig. 5. The circuit shown in Fig. 5 is basically the same as that shown in Fig. 3, except for differences hereinafter noted. The windings 51a, 51b, 51c and 51d are all normally of the same resistance and, as in the previous case, are parallel connected to points 64 and 65. Each winding, however, is wound so that its length is in proportion to the corresponding height in the tank. Thus winding 51a, Fig. 5 represents the first 10 gallons in tank 66, Fig. 4, or the height from level $k2$ to $L2$. Likewise, winding 51d represents the last 10 gallons in tank 66, or the height from level $n2$ to $o2$. Since the height of the first 10 gallons is, in this case, 2.34 times the height of the last 10 gallons, the length of winding 51a, will also be 2.34 times the length of winding 51d, even though they are of the same resistance value. In order to insure maximum accuracy in the system, each winding 51a, 51b, 51c and 51d can further be wound to compensate for the non-uniformity of the cross section of the tank within the range of said winding. Windings 51a, 51b, etc., can be taper wound to conform to the slope of the side of the tank so that for every gallon in the tank the wiper will travel over the same resistance increment. Under this condition, "single unit" scale 59 can be made an essentially even scale for practically any shape of tank, and is equally applicable at any level in the tank. Winding 21a operating element 37 has been shown of uniform resistance. This will result in a non-uniform calibration as shown on scale 57. This scale may be made more uniform by making winding 21a tapered as has been done for the windings 51a 51b, 51c and 51d. This, however, is not necessary since the intermediate readings between all the graduations of scale 57 can be taken on scale 59 and hence are made more uniform in this scale.

In operation, when the float 45 corresponds to level $k2$, of the tank shown on Fig. 4, wipers 23 and 26 will be at axis $k1$ and pointer 16 will indicate "0" on scale 57, while pointer 18 will indicate "0" on scale 59. As the float rises to level $L2$, Fig. 4, the wipers will move simultaneously to axis $L1$. Pointer 16 will now indicate "10" and pointer 18 will have travelled the full length of scale 59 to point "10." At this point, wiper 26 will engage the end of resistance strip 51a and the beginning of resistance strip 51b, causing the pointer 18 to return to zero as explained in conjunction with Fig. 3. As the fluid rises from level $L2$ to $m2$, Fig. 4, the wipers will move from axis $L1$ to $m1$ Fig. 5, causing pointer 16 to move from "10" to "20," and pointer 18 will again move through the range of scale 59. It should be noticed here that even though wiper 26 has covered proportionally less winding in moving from $L1$ to $m1$ than it did when moving from $k1$ to $L1$; in both cases the entire scale 59 was covered and that for each cycle a 10 gallon increment was covered. The same conditions are repeated for the cycles corresponding to the wiper movement from $m1$ to $n1$ and $n1$ to $o1$.

The principles applied to an indicator of the 90° or 120° type can also be applied to indicators having a full 360° of rotation. Fig. 6 shows an indicator 69 having two scales 70 and 71 and calibrated for 50 gallons. Scale 70 is the fine scale and is extended over a full 360°. This scale is divided into ten parts, not necessarily of equal increment. Scale 71 is the coarse scale, not necessarily a 360° scale. It is subdivided and calibrated according to the application at hand. In reading the indicator, the indication of pointer 73 is taken on scale 71 for the "tens" (or other unit), and the "units" are indicated by pointer 72 on fine scale 70. The scale of the indicator is thus in effect greatly amplified and in this particular application pointer 72 will make five complete revolutions while pointer 73 travels from "0" to "50" gallons as will be explained more fully hereinafter. In the illustration shown, the indicator reads "17."

Fig. 7 shows a circuit diagram suitable for the operation of indicator 69, Fig. 6. The transmitter comprises two resistor strips 74 and 75. Winding 75 is tapped at points 81 and 82 and by scale adjustment contacts 80 and 83 joined together by lead 84 which is connected to an element 76 of indicator 69 through connection leads 85, 86 and 87. Element 76 is comprised of three flux producing coils 76a, 76b and 76c cooperating with a permanently magnetized rotor 76d which carries pointer 73. Three series resistors 78a, 78b, 78c complete the circuit by connecting coils 76a, 76b, 76c, to the source of current 47. This circuit in itself is not a part of the present invention. Winding element 74 may be one continuous winding, tapped to suit requirements. In the case shown in Fig. 7 resistance winding 74 is divided into five sections 74a, 74b, 74c, 74d and 74e. These taps are all connected by a common lead terminal 88. Each section is again tapped to form three sub-sections, such as by taps 89a and 90a of section 74a, taps 89b and 90b of section 74b, etc. Taps 89a, 89b, 89c, 89d and 89e are connected by a common lead to a terminal 89, while taps 90a, 90b, 90c, 90d and 90e are connected by a common lead to a terminal 90. The individual sections thus formed may be taper wound. Terminals 88, 89 and 90 are connected to element 77 of indicator 69 through connection leads 91, 92 and 93 respectively. Element 77 is similar to element 76, and need not be described further. Wipers 95 and 96 are mechanically connected. Since both are grounded, they may also be electrically connected.

In operation, when the moving element of the transmitter is in a position represented by axis $a$, Fig. 7, wiper 95 will be directly over tap 88a causing the pointer 72 to read "0" on scale 70. Simultaneously wiper 96 will be slightly past tap 80 on winding 75 causing the pointer 73 to read "0" on scale 71. As the wipers move from axis $a$ to $b$, the pointer 73 will move from "0" to "10." Wiper 95 will have travelled from tap 88a to tap 88b, which is at the same potential. Hence the pointer 72 will have travelled from "0" around 360°, back to "0" (or "10"). As the wipers continue to travel from axis $b$ to axis $c$, pointer 73 will travel from "10" to "20" on scale 71, and pointer 72 will have made another revolution around scale 70. The process will be repeated until the moving element of the transmitter has completed its travel across the windings.

When applied to tanks for liquids, the same compensation for an irregular shape of said tanks that has been applied in the arrangement shown on Fig. 5 can be applied to this system.

It is understood that all numerical values shown are merely for the purpose of illustration and that other values and/or proportions may be used to suit a particular application. Also, the arrangements of the pointers need not be concentric as shown in Fig. 1. The physical arrangement of the two scales may be varied in any desired manner without departing from the scope of the invention.

While the invention has been described in detail with respect to certain preferred examples and embodiments, it will be understood by those skilled in the art after understanding the invention that various changes and modifications may be made without departing from the spirit and scope of the invention and it is intended therefore, in the appended claims, to cover all such changes and modifications.

We claim:

1. Telemetric device comprising an electrically controlled indicating means including a permanently magnetized rotor and a plurality of deflecting coils effective to control the position of said rotor for coarse indications, said indicating means being calibrated to indicate a range including a plurality of units to be measured, a similar electrically controlled indicating means including a permanently magnetized rotor and a plurality of deflecting coils effective to control the position of said rotor for fine indications, said fine indicating means being calibrated to indicate one unit of the total range of the coarse indicating means on an enlarged scale; controlling means including a resistor electrically connected in a circuit with the deflecting coils of said coarse indicating means and a source of current, a plurality of resistance elements connected in parallel in a circuit with the deflecting coils of said fine indicating means and said source of current, corresponding terminals of each of said resistance elements being at the same potential, said resistance elements being equal in number with the number of units measured by the coarse indicating means, a contact slidably engaging the resistor for changing the effective resistance value thereof, a second contact constructed to slidably engage successive resistance elements for changing the effective resistance value of the engaged resistance element, said resistance elements all having the same total resistance but being so wound, disposed and arranged as to extend over portions of said controlling means corresponding respectively to predetermined equal ranges of the variable physical magnitude to be indicated independently of the lengths of the respective portions of the path of said second contact subtended by said ranges, so as to provide accurate indications of said magnitude on a uniformly calibrated scale on said indicating means, means adapted to be controlled by a variable physical magnitude to be measured for simultaneously and similarly moving both slider contacts, said contact moving means being arranged and adjusted so as to move the second slider contact over the entire length of one of said resistance elements thereby causing the fine indicating means to move through its total range when and while the first slider contact is moved over a single section of said resistor causing the coarse indicating means to move through one of the units thereof.

2. A telemetric device in accordance with claim 1, wherein said resistor of the transmitter for the coarse indicating means is a single continuous resistor wound on an insulating element and having the turns thereof engaged by the first-named slidable contact, and wherein this resistor and two series connected deflecting coils of said coarse indicating means are both connected in parallel across said source of current, said resistor acting as a potentiometer resistance; and wherein each of said resistance elements is a resistance coil wound on an insulating support and having the turns thereof directly engaged by said second contact, all said resistance elements being electrically connected in parallel with one another and each being connected as a potentiometer resistance across said source of current, two series connected deflecting coils of said fine indicating means being also electrically connected in parallel with said resistance elements and across said source of current; and means electrically connecting the first named slidable contact to the connection between the two deflecting coils of said coarse indicator, and other means electrically connecting said second contact with the connection between the two deflecting coils of said fine indicating means.

3. A telemetric device in accordance with claim 1, wherein said resistor is a single continuous resistance coil wound on an insulating support and having the turns thereof engaged directly by the first-named slidable contact, conductors electrically connecting both ends of said resistor to one another and to said coarse indicating means, and two other conductors respectively connecting the one-third and two-thirds points along said resistor with the deflecting coils of said coarse indicating means, said coarse indicating means having three deflecting coils effective by the relative current flow therethrough to move an indicator through a substantially 360° path; and wherein said resistance elements are formed as parts of a single continuous resistance coil, wound on an insulating support, and the turns of which are engaged by said second contact, wherein said fine indicating means is a 360° ratiometer-type instrument similar to said coarse indicating means and including three deflecting coils, and electric conductors connecting each of said resistance elements with said deflecting coils of the fine indicating means in the same manner as said resistor of the coarse indicating means is connected to its respective indicating means, each section of the resistance coil making up said resistance elements being connected substantially in parallel with every other section.

CLARENCE A. DE GIERS.
LOUIS M. CAMPANI.

REFERENCES CITED

The following references are of record in the file of this patent:

UNITED STATES PATENTS

| Number | Name | Date |
|---|---|---|
| 1,691,360 | Reagan | Nov. 13, 1928 |
| 2,132,213 | Locke | Oct. 4, 1938 |
| 2,148,075 | Kiner | Feb. 21, 1939 |
| 2,198,055 | Liner | Apr. 23, 1940 |
| 2,216,069 | Doyle | Sept. 24, 1940 |
| 2,289,202 | McCoy | July 7, 1942 |
| 2,388,559 | Macintyre | Nov. 6, 1945 |
| 2,391,058 | Lingel | Dec. 18, 1945 |
| 2,396,244 | Borsum | Mar. 12, 1946 |

FOREIGN PATENTS

| Number | Country | Date |
|---|---|---|
| 102,104 | Great Britain | Nov. 16, 1916 |
| 104,777 | Great Britain | Mar. 22, 1917 |